United States Patent [19]
Walker

[11] Patent Number: 5,680,172
[45] Date of Patent: Oct. 21, 1997

[54] CONSECUTIVE FRAME SCANNING OF CINEMATOGRAPHIC FILM

[75] Inventor: Bradley William Walker, Dallas, Tex.

[73] Assignee: Video Post & Transfer, Inc., Dallas, Tex.

[21] Appl. No.: 195,988

[22] Filed: Feb. 14, 1994

Related U.S. Application Data

[63] Continuation of Ser. No. 822,762, Jan. 21, 1992, abandoned.

[51] Int. Cl.$^6$ ........................................ H04N 3/36
[52] U.S. Cl. ........................... 348/97; 348/100; 348/103
[58] Field of Search ................... 348/96, 97, 105, 348/207; H04N 3/36

[56] References Cited

U.S. PATENT DOCUMENTS

| | | | |
|---|---|---|---|
| 4,127,869 | 11/1978 | Millward | 358/54 |
| 4,164,761 | 8/1979 | Matchell | 358/215 |
| 4,184,177 | 1/1980 | Millward | 358/214 |
| 4,191,972 | 3/1980 | Matchell | 358/214 |
| 4,205,337 | 5/1980 | Millward | 358/54 |
| 4,214,268 | 7/1980 | Keznickl et al. | 358/127 |
| 4,268,865 | 5/1981 | Millward | 358/216 |
| 4,288,818 | 9/1981 | Poetsch | 358/214 |
| 4,329,715 | 5/1982 | Attridge | 358/214 |
| 4,356,514 | 10/1982 | Armstrong et al. | 358/214 |
| 4,418,360 | 11/1983 | Glasgow | 358/108 |
| 4,485,406 | 11/1984 | Brownstien | 358/227 |
| 4,513,324 | 4/1985 | Poetsch et al. | 358/214 |
| 4,603,966 | 8/1986 | Brownstein | 355/45 |
| 4,630,120 | 12/1986 | Childs | 358/214 |
| 4,660,091 | 4/1987 | Nutting | 358/214 |
| 4,680,638 | 7/1987 | Childs | 358/214 |
| 4,694,345 | 9/1987 | Rodgers | 358/216 |
| 4,746,985 | 5/1988 | Waldrom et al. | 358/216 |
| 4,814,885 | 3/1989 | Beard | 348/96 |
| 4,823,204 | 4/1989 | Holland | 358/347 |
| 4,843,468 | 6/1989 | Drewery | 358/140 |
| 4,855,836 | 8/1989 | Shearer | 358/214 |
| 4,897,729 | 1/1990 | Mumford et al. | 358/216 |
| 4,914,520 | 4/1990 | Beard | 358/214 |
| 4,984,086 | 1/1991 | Mumford et al. | 358/216 |
| 5,014,133 | 5/1991 | Mumford | 358/214 |
| 5,049,984 | 9/1991 | Moore, Jr. et al. | 358/54 |

Primary Examiner—Andrew Faile
Assistant Examiner—Andrew B. Christensen
Attorney, Agent, or Firm—Robert Hardy Falk; Tom R. Vestal; Falk & Fish, l.l.p.

[57] ABSTRACT

A new and useful method is disclosed for transferring information from cinema film at a first speed to broadcast quality video signals at a second and different, predetermined speed which may be greater or less than the first speed, in a telecine with an internal frame store using a beam of optical information signals. This method comprises the steps of (1) transporting said film at a substantial constant speed through a raster style light beam generator at said first speed, said beam generator and film generating a beam of optical information signals; (2) forwarding said optical information signals to an internal frame store having a pulse, said frame store and pulse operating at a second and predetermined speed, said telecine having a sprocket and a capstan with a biphase tachometer attached thereto, said tachometer providing a signal, and a multibit counter means providing a count with which to measure the phrase of the sprocket relative to the frame store pulse, wherein the rate of the frame store pulse and the rate indicated by the signal from the tachometer have the ratio of two integers, to collect information from said film; and (3) outputting the information forwarded from said frame store to an external destination, wherein the difference in said first and second speeds causes selected alignment of the cinema film with the optical beam.

35 Claims, 7 Drawing Sheets

FIG. 1

CAPSTAN VELOCITY

*FIG. 2*

CAPSTAN
*FIG. 3*

CONSECUTIVE FRAME SCANNING OF CINEMATOGRAPHIC FILM

This is a continuation of application Ser. No. 07/822,762, filed on Jan. 21, 1992 now abandoned.

BACKGROUND OF THE INVENTION

This invention relates to a flying spot telecine apparatus, and particularity to modification of existing flying spot telecine apparatus to increase the flexibility and usefulness of the apparatus in converting cinematographic film to video signals.

A flying spot telecine apparatus is one in which consecutive frames of cinema film are optically scanned in a raster fashion by a light beam of small cross section (flying spot). Picture information modulated onto the light beam from the film is converted by one or more opto-electronic detectors into electrical signals or video signals, and the signals are thereafter processed in a predetermined known manner.

The United States television standard for raster scanning comprises a five hundred twenty-five (525) line/sixty (60) field operation. The cinematographic film is normally driven at 24 frames per second through a conventional telecine apparatus for conversion to a video signal, the same rate at which the film is photographed.

It has become important for photographers and film makers to vary the transport speed of the film to obtain special effects. For example, moving objects shot at a slower than conventional speed will photograph differently depending on the relative motive speeds of the subject being photographed—a stick in motion, for example, may be more blurred in the film frame than the hand moving it.

The speed at which the film is photographed may vary substantially from the speed conventional telecine apparatus are designed to operate, and it has been found that present flying spot telecine apparatus have not been able to adequately handle the different speeds. For example, the speed of motion will vary with the ratio of the speed at which the cinematographic film was shot with the speeds at which the film is converted to video signals. If audio is simultaneously recorded with the film, an additional problem in translation is presented. Therefore, it is a purpose of the present invention to modify an existing flying spot telecine apparatus as enumerated herein. With the modifications to disclose existing apparatus, the apparatus are now able to operate at very slow speeds as well as high speeds.

DESCRIPTION OF THE INVENTION

In the conventional 24 frame per second film transfer speed for the United States television systems, only some 485 lines of the potential 525 lines are actually used to transmit the signals. The remaining lines appear as a black line, sometimes seen as the television screen "rolls over." The number of lines actually scanned (active lines) as part of a picture varies as the film frame speed varies. It is these active lines which are used for the actual transmission of information in the form of a video signal.

Registering the active lines in a video signal with the frames of a cinema film for purposes of recording the images in the frame of the cinema film presents some difficulty. The modifications herein add substantially to machine capability to obtain and maintain registration film frames with the raster scanning active lines.

In the Rank Cintel MKIIIB and MKIIIC telecine apparatus, the operative speed range for video transfer is between 16 and 30 frames per second. The apparatus can be operated at 64 different increments within that speed range. It has been found, however, that this speed range limitation creates distortions in the recording process when attempting to optically scan film photographed outside that speed range. For example, if a cinema film is shot at 6 frames per second, the slowest scanning rate of the telecine machine (16 frames per second) introduces a distortion of motion speed into the modulated picture information of the film scene. Therefore, a purpose of this invention is to obtain broadcast quality operation of the Rank Cintel machine of a cinema film optically at the same speed at which it was photographed or for any other speed from a −30 frames per second to +96 frames per second without image distortions in the stored video signals. In theory, the device can operate with the modifications herein between −600 and 600 frames per second with varying degrees of distortion. Factors affecting the speed range are, e.g., film size, camera apparatus, and magnification by the telecine.

It has also been found with the present conventional apparatus, especially when starting and stopping or changing speeds, that conventional apparatus cannot smoothly make the conversion to those changes, creating an off register between the cinema frames and the raster scanning being conducted by the telecine apparatus. This shows up in the form of lines or "roll overs," as well as vertical position and size errors in the modulated picture information. A purpose of this invention is to permit smooth and controlled variations in the scanning speed of the telecine apparatus.

It is also a purpose of this invention to permit operation of the telecine apparatus in a manner so that, when it comes up to the requisite speed, the cinema film frames are correctly registered in the raster scanning beam by precise calculation rather than empirical determination. The framing can be calculated from a start position, from a current velocity for a determined second velocity, forward or backward, or stopped—all smoothly and without the heretofore distortions using the conventional apparatus. This is accomplished with a digital servo system as described utilizing:

a) high clock speeds to avoid limit cycles;

b) not allowing velocity/uncertainty errors to accumulate in the system;

c) operating the servo mechanism at substantially the maximum possible gain for a given computer sample rate and tachometer pulse rate.

The velocity servo gain can be maximized using the following equation:

$$\text{Velocity Servo Gain} = \frac{(\text{Run Velocity})(\text{Sample Rate})}{\text{Run Velocity} + \text{Sample Rate}}$$

The above has been accomplished by modifying a conventional flying spot telecine apparatus such as the Rank Cintel MKIIB or MKIIIC. The modification comprise replacing the conventional analog phase and speed measurements on the capstan device tachometer with digital reading and measuring components including sensing the phase of the film sprocket aperture digitally and comparing it digitally to the capstan velocity and phase. Further, the digital reading components are used in a manner that avoids cumulative error readings.

The method embodiment of this invention is most broadly directed to a method of converting cinema film information to broadcast quality video signals, said method comprising the steps of generating a beam of optical information signals by passing the cinema film at a first speed through a light beam generator and along a rotationally driven feed device; forwarding said optical information signals to a frame store device operative to generate an output pulse at a second speed different from said first speed; sensing the rotational phase of the feed device; correlating the sensed rotational phase of the feed device with said second speed in a manner maintaining a predetermined integer ratio therebetween; and creating a selected alignment between the frames of the cinema film and the optical information signal beam by maintaining a predetermined difference in said first and second speeds.

A preferred method transfers information from cinema film at a first speed to broadcast quality video signals at a second and different, predetermined speed which may be greater or less than the first speed, in a telecine with an internal frame store using a beam of optical information signals, comprising the steps of: transporting said film at a substantially constant speed through a raster style light beam generator at said first speed, said beam generator and film generating a beam of optical information signals; forwarding said optical information signals to an internal frame store of the telecine having a pulse, said frame store and pulse operating at a second and predetermined speed, said telecine having a sprocket and a capstan with a biphase tachometer attached thereto, said tachometer providing a signal, and a multibit counter means providing a count with which to measure the phase of the sprocket relative to the frame store pulse, wherein the rate of the frame store pulse and the rate indicated by the signal from the tachometer have the ratio of two integers, to collect information transferred from said film; and outputting the information forwarded from said internal frame store to an external destination, wherein the difference in said first and second speeds causes selected alignment of the frames of the cinema film with the optical beam.

A further preferred method is where the telecine has: (a) a nominal film operation rate of about 16 to about 30 frames per second, and notwithstanding said nominal rate, the film is passed at rates of less than about 16 frames per second and more than 30 frames per second through the telecine, and the only information stored in the frame store of the telecine is that generated when a film frame is properly positioned in the optical beam of the telecine; (b) a frame store and scanning beam driven by a pulse P from said frame store and having a nominal film rate from about 16 to about 30 frames per second, wherein the cinema film through the telecine at a frame rate outside said nominal rate, whereby the frame store stores information only when a film frame is properly positioned in the optical beam of the telecine, and said freezing method further includes the step of storage of image information in said frame store until a film frame is properly positioned in the optical beam; and (c) further includes means for providing a pulse signal upon detection of a sprocket hole in said passing cinema film, and said method further comprises the steps of operating the frame store and scanning beam of said telecine at a determined rate P in the nominal film rate of 16 to 30 frames per second, forwarding a pulse P/M from the frame store to a counter and freezing the storage of information by the telecine until a predetermined time after a pulse has been received from said sprocket hole-detection means to reset said counter when P/M is an integer multiple/submultiple of P and where M is an integer function of the film rate.

A still more preferred method exists where the biphase tachometer is associated with a capstan drive motor and produces at least two pulse streams approximately 90° out of the phase; and has: a first multibit counter, said counter being driven by a clock of at least 10 MHz; and a first multibit register connected via a microprocessor driving a capstan servo motor said first register reading the instantaneous count of said first multibit counter upon a signal from said tachometer and transmitting said count back to said microprocessor, wherein said microprocessor compares said count with a next previously stored count to determine the velocity of the capstan, and includes a first up/down multibit counter driven by a clock of at least 10 MHz, a multiple decoder for receiving the at least two 90° out of phase pulse streams from the biphase tachometer and for forwarding decoded pulse streams indicating count and direction to said first up/down multibit counter to indicate, upon receipt of signal from said capstan drive motor, the phase position of said capstan, where said pulse streams produced by the biphase tachometer are at least 5000 pulses per revolution of said capstan. This more preferred method may further comprise: (a) a second multibit counter operative to measure the phase of the sprocket relative to the frame pulse of the frames stored and driven at a clock rate of at least 10 MHz; and (b) a second multibit register, said second multibit register sampling the count of said second multibit counter upon receipt of said the pulse signal from said sprocket hole detection means forwarding the sampled count via the microprocessor means to the capstan motor to signal frame phase alignment and/or error therein; and includes (1) a signal divider for receiving a pulse signal from said frame store for dividing the signal by a factor M and transmitting a signal 1/M to the second multibit counter to reset the second multibit counter and (2) a third multibit register for sampling the count of said second multibit counter upon signal from said microprocessor, where the pulse from said frame store is transmitted simultaneously to said raster style light beam generator and said signal divider.

An even more desirable method comprises the step of operating the capstan servo motor drive at a velocity gain determined by the equation:

$$\text{Gain} = \frac{(\text{Run Velocity})(\text{Sample Rate})}{\text{Run Velocity} + \text{Sample Rate}}$$

where "Run Velocity" is the current capstan velocity in the capstan drive servo motor drive, and "sample rate" is the rate from said microprocessor to said first multibit register.

The most preferred method is an improvement in a cinema film to video transfer machine having a capstan drive and servo motor means including a capstan; a raster style video beam generating means; an optical transfer means; a video translation means; and a frame store means operable in a given speed range of frames per second, the improvement comprising: (1) a sprocket hole detection means, including means for generating a first signal; (2) means for determining the phase position and velocity of the capstan, including (a) a biphase tachometer producing at least two pulse streams approximately 90° out of phase to each other; (b) a first multibit counter, said counter being driven by a clock of at least 10 MHz; (c) a first multibit register connected via a microprocessor means to said first multibit counter reading the instantaneous count of said first multibit counter upon signal from said tachometer and transmitting said count back to said microprocessor means, wherein said microprocessor means compares said count reading with the next previously stored count to determine the velocity of said capstan; and (3) means for driving the capstan drive and servo motor means at a capstan linear drive rate outside the frame store given speed range while producing broadcast quality images, said means for driving the capstan and servo motor means including means of adjusting the linear film rate to an integer multiple/submultiple of the frame store speed.

The most preferred method may include a first up/down multibit counter driven by a clock of at least 10 MHz, a multiple decoder means for receiving at least the two 90° out of phase pulse streams from said biphase tachometer and forwarding decoded pulse streams indicating count and direction to said first up/down multibit counter, said pulse streams representing the phase position of said capstan; wherein said pulse tachometer has pulse streams of at lest 5,000 pulses per revolution of said capstan.

The most preferred method may further comprise: (a) a second multibit counter driven at a clock rate of at least 10 MHz; (b) a second multibit register connected to said sprocket hole detection means, said second multibit register sampling the count of said second multibit counter, upon receipt of said first pulse signal from said sprocket hole detection means and forwarding the sampled count via said microprocessor means to the capstan motor and servo drive means to signal frame phase alignment or error thereto and includes a means for receiving a pulse signal from said frame store means, dividing the signal by a factor M and transmitting the divided signal 1/M to said second multibit counter to reset said counter, where 1/M is a submultiple of the frame store given speed, also including (1) means for transmitting the frame store pulse signal simultaneously to said raster style video beam generating means, initiating raster scan sequence of said beam means, and to said signal divider means and (2) a third multibit register, said register sampling the count of said second multibit counter upon signal from said microprocessor means, with the method of determining the start/stop time of: (a) a sampling the phase count of said second multibit counter until the desired phase count is reached or exceeded; and (b) initiating the velocity/position change in accordance with the equation;

START TIME =

$$\left\{ \text{OFFSET} - \frac{(1/2 \ PL) \ (FPS)^2 (TACH)}{ACCEL} + (\text{Framing})(PL) \right\} \ Mod \ PL$$

where OFFSET is a mechanical correction factor specific to the machine; PL is the phase limit or maximum number that the phase counter counts to before it is reset; FPS is the number of film frames per second; TACH is the number of tachometer pulses; ACCEL is the rate of acceleration of the capstan; and FRAMING is a framing adjustment number varying between ±0.5.

The apparatus embodiment of this invention is broadly directed to a cinema film-to-video transfer machine comprising: (a) a cinema film signal creation system, including a video beam generating device through which a cinema film may be passed, for creating cinema film optical information signals; (b) a rotational drive system for engaging and driving the cinema film through said video beam generating device at a first speed the drive system having a rotational speed and phase; (c) a frame store device operative to receive said optical information signals, said frame store device having an output pulse generated at a second speed different from said first speed; and (d) a conversion control system operative to correlate the rotational phase of said drive system with said second speed in a manner maintaining a predetermined integer ratio therebetween, and create a selected alignment between the frames of the cinema film and the beam of the video beam generating device by maintaining a predetermined difference in said first and second speeds.

A more preferred apparatus is an improved telecine operative to convert cinema film information to broadcast quality video signals, comprising: (a) a raster style light beam generator through which cinema film may be transported at a first speed to generate a beam of optical information signals; (b) an internal frame store for receiving said optical information signals and transferring related information to an external destination, said internal frame store operating at a second speed and having a pulse; (c) a sprocket and capstan system operative to drive the cinema film at said first speed through said light beam generator, said sprocket and capstan system having a biphase tachometer attached thereto and operative to provide a signal, and multibit counter means operative to provide a count with which to measure the phase of the sprocket relative to the frame store pulse; (d) the rate of the frame store pulse and the rate indicated by the signal from the tachometer having a ratio of two integers; and (e) the difference in said first and second speeds being operative to cause a selected alignment of the frames of the cinema film with the beam of optical information signals.

Another further preferred apparatus is described where the improved telecine has a nominal cinema film operation rate of about 16 to about 30 frames per second; said sprocket and capstan system, notwithstanding said nominal cinema film operation rate, is operative to pass cinema film through the improved telecine at rates of less than about 16 frames per second and more than about 30 frames per second; and said frame store is operative to store therein only cinema film information generated when a film frame is properly positioned in the optical beam.

A still more improved telecine is disclosed where the improved telecine (1) has a scanning beam driven by a pulse P from said frame store, and has a nominal cinema film rate from about 16 frames per second to about 30 frames per second, said sprocket and capstan system is operative to drive the cinema film through the improved telecine at a frame rate outside said nominal rate, said frame store is operative to store information only when a film frame is properly positioned in the optical beam, and said frame store is further operative to freeze storage of image information therein until a film frame is properly positioned in the optical beam; and (2) further comprises means for detecting a sprocket hole in the passing cinema film and responsively generating a pulse signal, the frame store and scanning beam of the improved telecine are operative at a determined rate P within the nominal film rate of about 16 to about 30 frames per second, the improved telecine further comprises a counter, and said frame store is operative to forward a pulse P/M to said counter, freeze the storage of information by the improved telecine until a predetermined time after a pulse has been received from said sprocket hole detection means, and reset said counter when P/M is an integer multiple/submultiple of P and M is an integer function of the film rate; where said biphase tachometer is associated with a capstan drive motor and is operative to produce at least two pulse streams approximately 90° out of phase with one another and has a first multibit counter driven by a clock of at least 10 MHz and a first multibit register connected via a microprocessor driving a capstan servo motor, said first register reading the instantaneous count of said first multibit counter upon a signal from said tachometer and transmitting said count back to said microprocessor said microprocessor being operative to compare said count with a previously stored count to determine the velocity of the capstan.

A more desirable improved telecine comprises a first up/down multibit counter driven by a clock of at least 10 MHz and a multi decoder for receiving at least two 90° out of phase pulse streams from the biphase tachometer, and for forwarding decoded pulse streams indicating count and direction to the first up/down multibit counter to indicate, upon receipt of a signal from said capstan drive motor, the phase position of the capstan, wherein the pulse streams produced by the biphase tachometer and at least 5000 pulses per revolutions Of the capstan.

The most desirable improved telecine of the invention comprises: (1) a second multibit counter operative to measure the phase of the sprocket relative to the frame pulse of the frame store and driven at a clock rate of at least 10 MHz, and a second multibit register operative to sample the count of said second multibit counter upon receipt of said pulse signal from said sprocket hole detection means and forwarding the sampled count via the microprocessor to the capstan motor to signal frame phase alignment and/or error therein; (2) a signal divider for receiving a pulse signal from said frame store, dividing the received pulse signal by a factor M, and then transmitting the divided pulse signal to the second multibit counter to reset the second multibit counter, wherein said frame store is operative to transmit said pulse thereof simultaneously to said raster style light beam generator and said signal divider; and (3) a third multibit register for sampling the count of said second multibit counter upon signal from said micro processor.

Such a preferred apparatus may exist where said capstan drive motor is operated at a velocity gain determined by the equation:

$$\text{Gain} = \frac{(\text{Run Velocity})(\text{Sample Rate})}{\text{Run Velocity} + \text{Sample Rate}}$$

where "Run Velocity" is the current capstan velocity in the capstan drive motor and "Sample Rate" is the rate from said microprocessor to said first multibit register.

DETAILED DESCRIPTION OF THE DRAWINGS

Figure 1:
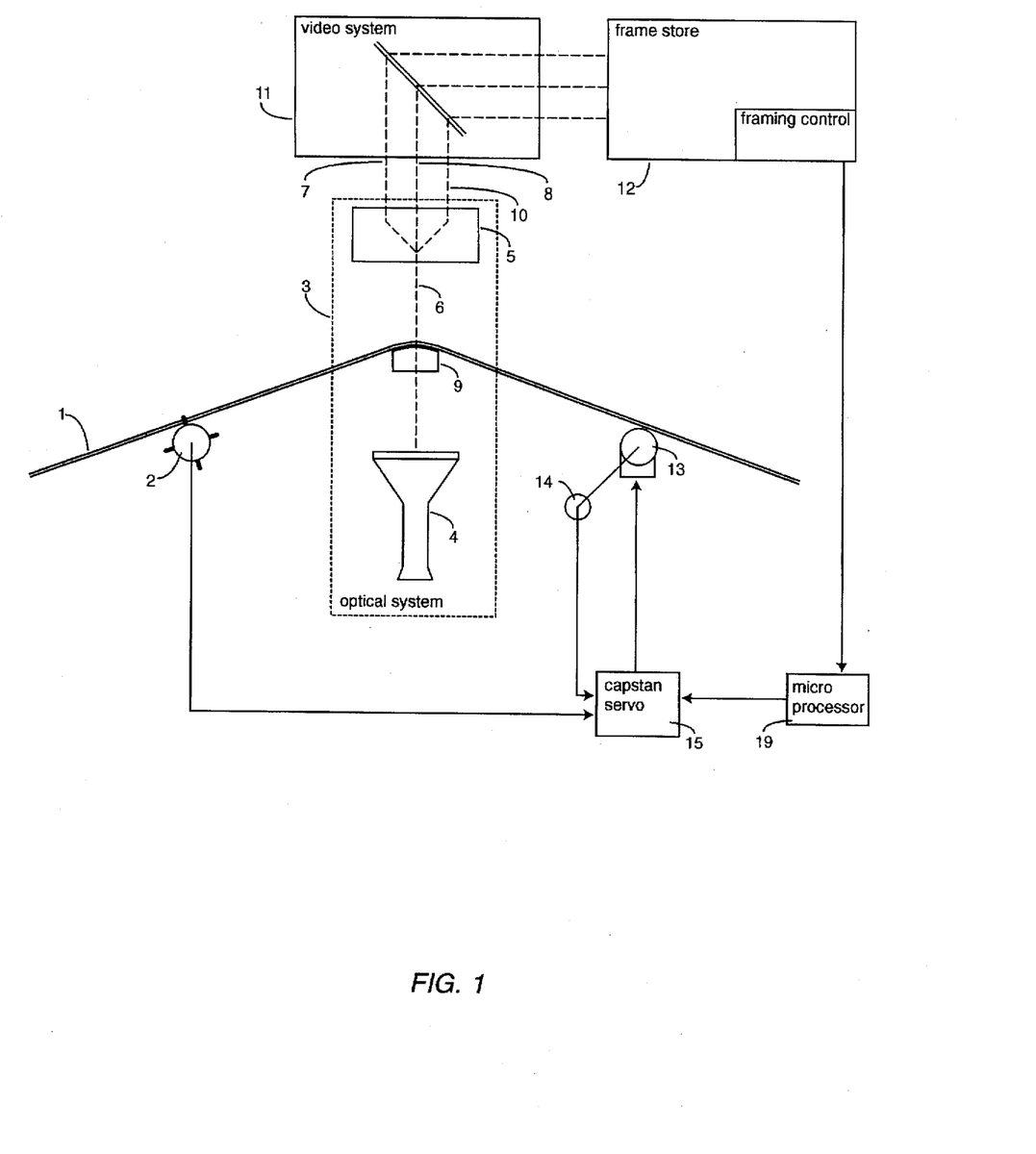
FIG. 1 is a simplified blocked diagram of the operation of a conventional flying spot telecine apparatus.

In FIG. 1, there is shown in block diagram form the essential elements of a flying spot scanning device in which a strip of film 1 is fed through the system past a sprocket hole detector 2 to an optical system 3 in which a raster scanning tube 4 projects images through the film. The film 1 is positioned vertically and laterally the optical system by optical guide 9. A beam splitting device 5 within the optical system 3 splits the projected optical beam 6 into its red, green, and blue color components 7, 8, and 10.

Beams 7, 8, and 10 are captured within video system 11 where they are amplified, corrected, and processed prior to being forwarded to a digital storage system 12, otherwise known as the "frame store," sequential to interlace convertor, or, in the case of a Rank Cintel machine, a Digiscan device.

The film 1 is linearly conveyed through the optical system by a motor drive capstan 13. The speed of the capstan is measured by a tachometer 14 which feeds information to a capstan servo mechanism 15. A framing control signal also enters the capstan servo from the digital storage system 12.

Figure 2:
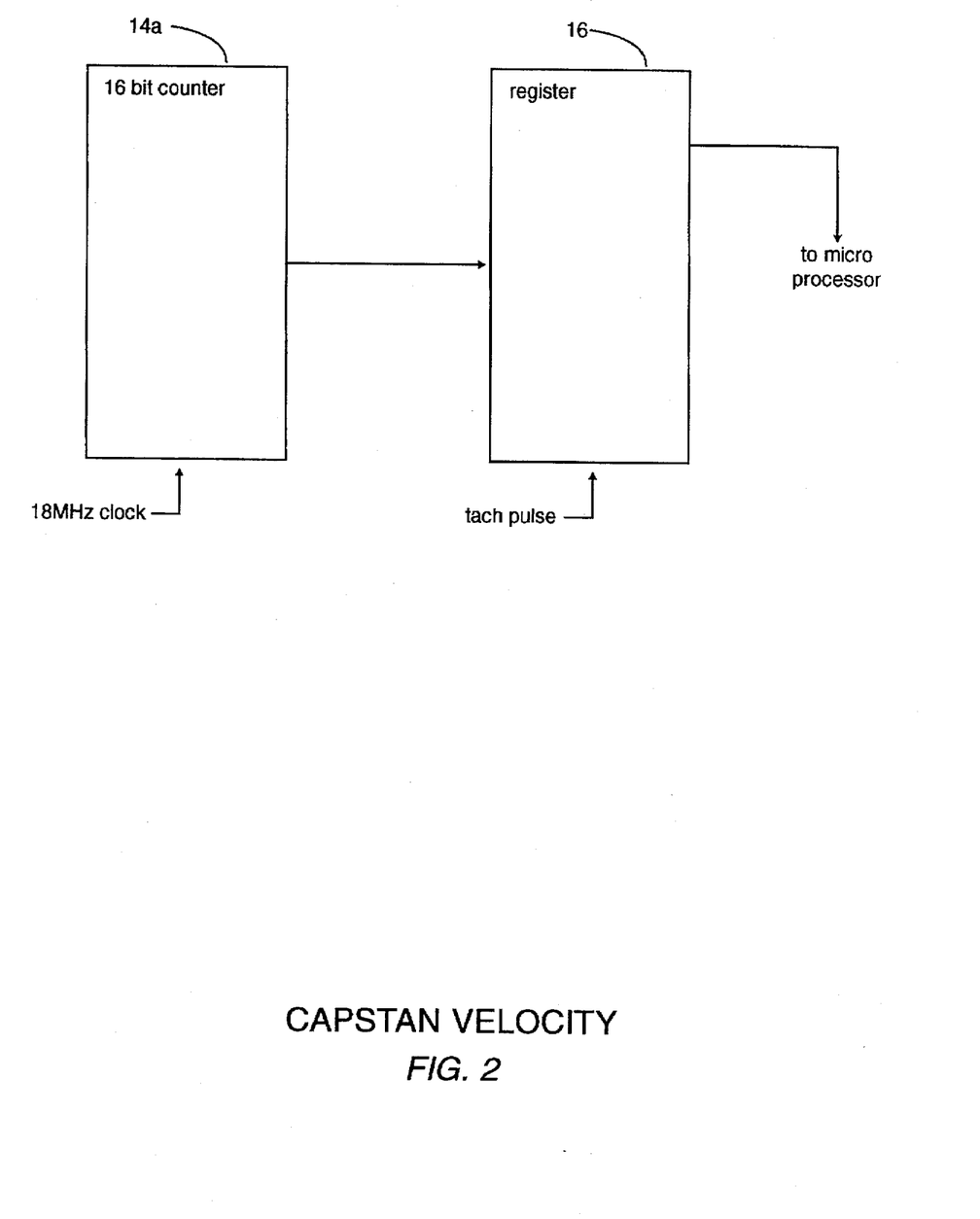
FIG. 2 is a block diagram depicting digital counting devices used in the velocity measurement of the capstan.

In FIG. 2, the capstan velocity is digitally measured by a 16 bit counter 14a driven by relatively high speed clock 15. The clock speed drive is preferably above 10 Mhz, most preferably 18 to 54 MHz. Counter circuit 14a is read by a register 16 each time a pulse is received from the tachometer 14, each pulse indicating 1/5000 rotation of the capstan 13. Sprocket hole detector 2 may be a toothed roller or an aperture detection sensing device.

Figure 3:
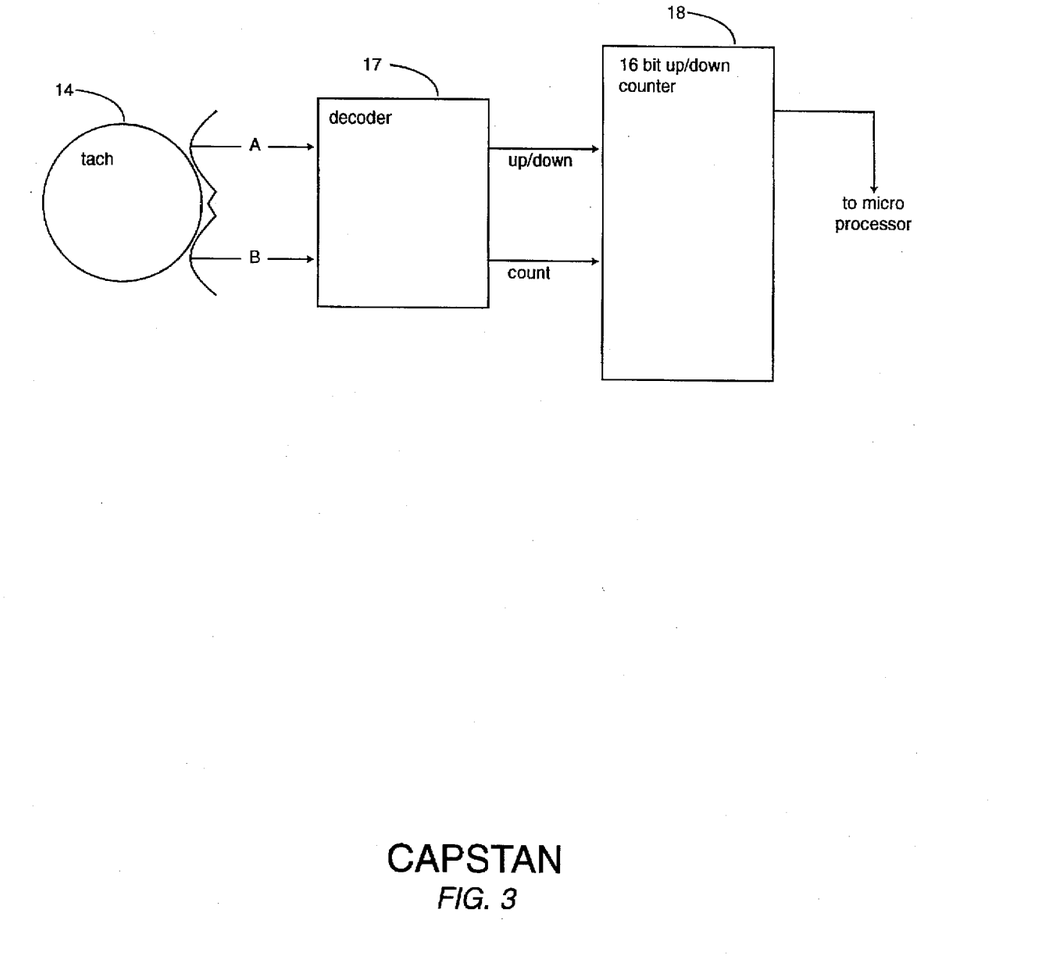
FIG. 3 is a block diagram showing the modification for determining the capstan phase position.

The capstan phase position is determined in the manner indicated in FIG. 3 by a quadrature-decoder 17 providing up/down counts to a 16 bit up/down counter 18. This phase measuring device is commercially available in the form of a single chip HCTL2016 manufactured by Hewlett Packard.

Figure 4:
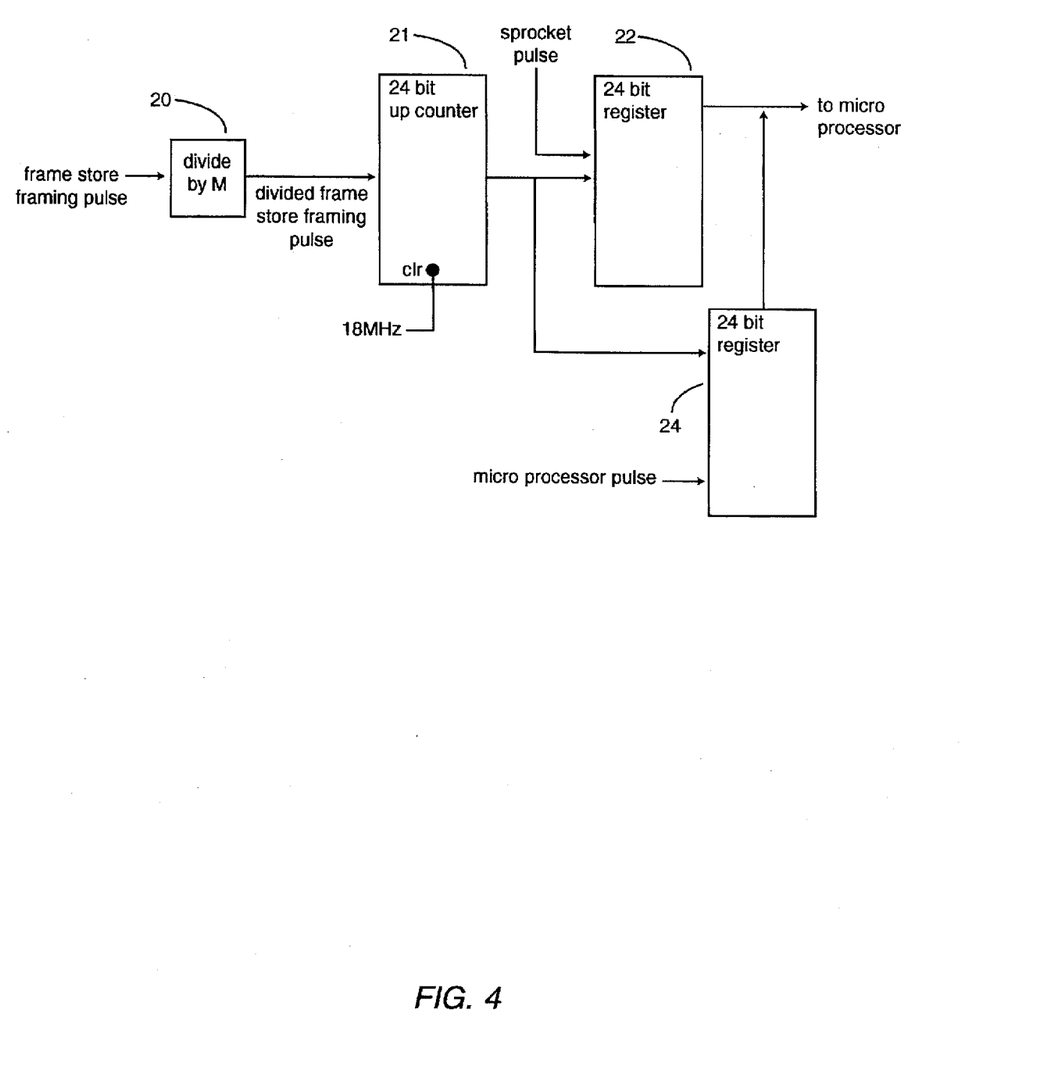
FIG. 4 depicts the pulse dividing circuit in the servo-slave mode.
Figure 7:
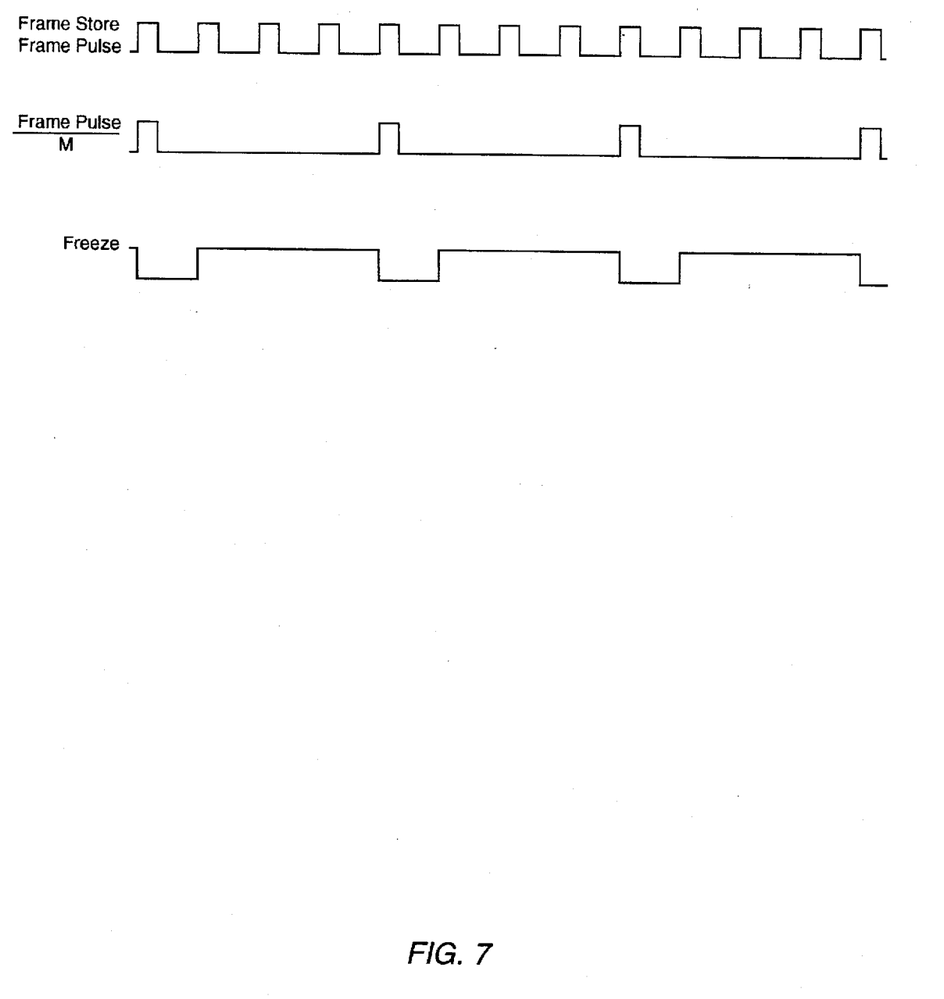
FIG. 7. is a schematic illustrating the period between pulses representing the film frame interval resulting from the frame store after processing by the device of FIG. 4.

In FIG. 4, a frame pulse from the frame store device 12 is divided by an integer M supplied from microprocessor 20 producing a divided frame pulse that is delivered to a 24 bit up counter 21 driven by an 18 megahertz clock. The divided pulse from the frame store is used to reset the phase counter 21. The period between pulses represents the film frame interval (See FIG. 7). The sprocket phase is measured by sampling the phase count upon occurrence of a sprocket hole pulse. This causes the film 1 to be linearly driven at an integral submultiple of the frame store signal rate.

There are M frame store cycles per film frame. By freezing the frame store on all cycles except the first one in a film frame, a coherent picture can be obtained. By selecting a velocity such that the frame rate is a multiple N of the divided frame store pulse, calculating the sprocket phase every Nth film frame, the film can be made to run at N times the normal rate. This gives us an effective linear film frame transfer rate of N/M times the normal rate.

In FIG. 2, the velocity sensor of capstan 13 is a 16 bit counter 14a, clocked at 18 megahertz. Upon receiving a pulse from the capstan tachometer 14, indicating 1/5000 revolution of capstan 13 the value of the count in the counter 14a is frozen by register 16. Importantly, the counter continues to count and is not reset. Continuing the count prevents cumulative errors that would otherwise create a system failure.

The pulse from the tachometer 14 also signals the microprocessor that a reading is available. The microprocessor reads the register 22 and compares it to the last reading taken. This provides a comparison number in the microprocessor's memory which provides the time between the two pulses—i.e. a period measurement. When the tach rate is faster than the microprocessor sampling rate, the two pulses in the period measurement may be adjacent. Therefore, the period must be corrected by accounting for the intervening pulses, We know what the pulses are because the multibit counter 18 has been keeping track of them, The 16 bit up/down counter 18 in FIG. 3 indicates the actual rotational phase or rotational position of the capstan. A simple method is provided to determine the exact position of the framing and provides much finer control on stopping, starting, or changing between velocities.

As indicated in FIG. 3, the capstan tachometer puts out two pulse streams: a and b. The pulse streams are nominally at 90 degrees to each other and can be used to determine the direction, as well as the speed. Feeding this information into the microprocessor indicates the phase or position of the capstan. By measuring the phase position, the count between pulses, and the number of pulses to the target position, the microprocessor can determine when to initiate acceleration/ deceleration procedures, e.g., to slow the capstan down and stop when the last sprocket pulse indicates the film is in the target position.

When the film is sitting still, the raster is at a nominal scan size. As the film is moved either backwards or forwards, the scan size has to be adjusted. This adjustment takes place through a device such as the Rank Zoom System. While previously the adjustment of the scan size versus the film speed was a matter empirically determined, the scan size can now be derived for any film speed using the improvements herein described. The vertical scan size is proportional to the equation:

$$\frac{1}{M} = \frac{(\text{Film Pitch})(\text{No. Active Lines})(\text{Film Frame Per Second})}{(\text{Film Picture Height})(\text{Line Scanning Rate})}$$

EXAMPLE

For a 35 mm film, 485 lines per frame, a film pitch of 0.7464", a film picture height of 0.594", and a line scanning rate of 21,000 Hz. Given this example, the vertical scan size for 24 frames per second at a magnification (M) of 1, the calculation is as follows: [1/1–0.7464×485×24/(0.594×21,000)]=0.30. Therefore, the vertical scan size at 24 frames per second is 30% of the still frame size.

Measurement of the phase as well as the velocity of the capstan permits greater flexibility in the speed control and positioning of the film. Having the ability to compare the capstan values with the sprocket phase also provides an opportunity to determine if the film has broken, too much slippage is occurring in the capstan drive, etc. It is a protective mechanism which provides for safer handling of film passing through the machine, as well as being a means of forwarding the film at the right velocity for a given linear positional translation of the film.

Digital monitoring of the sprocket and capstan also provides for additional means of error detection and control in the various elements. For example, the system can be used to determine and adjust for out-of-round condition in the sprocket. For example, in a 35 mm film, there are 4 pulses per rotation of the sprocket. By averaging the current sprocket pulse with the sprocket pulse which occurred ½ rotation away, an average count can be determined which cancels the eccentricity of the sprocket. Furthermore, an average of the sprocket count can be accumulated over a period of time to give an indication of the eccentricity of the shaft rotation.

Digital monitoring and control also provides an easy way in which to initiate acceleration of film from a stopped condition so that the capstan arrives at a given velocity at the same time that the film is at the proper phase of the frame relative to the raster scanning beam, i.e. the film starts up smoothly and is properly framed when the correct velocity is achieved.

A method to determine the start time in which to initiate acceleration to go from one velocity to another (e.g. from 0 velocity to a given velocity for film speed) can be stated by the equation:

$$\text{START TIME} = \left\{ \text{OFFSET} - \frac{(1/2\ PL)\ (FPS)^2 (TACH)}{ACCEL} + (\text{FRAMING})(PL) \right\} \text{Mod } PL$$

where the offset is a mechanical correction factor specific to the machine, PL is the phase limit or maximum number that the phase counter counts to before it is reset—either by itself or by the frame store; FPS is the number of film frames per second; TACH is the number of tachometer pulses; ACCEL is the rate of acceleration of the capstan; and FRAMING is a framing adjustment number varying between±0.5. The whole quantity is modulo the phase limit since the results may be a rather large number. The full answer should be constrained to be less than the phase limit.

In calculating the target phase for which a sprocket pulse should occur the following determines an integer between 0 and the phase limit (number of clock counts per frame) minus one:

(1) 0<Target Phase<Phase Limit–1;
(2) Target Phase=[(Phase Limit)(2+Framing+Offset$_p$)+ Offset$_T$]Mod Phase Limit Where: Offset$_p$=mechanical alignments of sprocket; Offset$_T$=adjustment for film size and scan center
Framing=position to end of frame (±0.5)
Phase error=[(Phase–Target Phase+3/2 Phase Limit) Mod Phase Limit]–½ Phase Limit
The phase error is used to adjust the capstan velocity such that the phase error is driven to zero.

The flexibility of the modifications disclosed herein become apparent when it is considered that they permit operation of the telecine apparatus in two modes. For purposes of discussion, we will call the first mode a servo-slave mode, and the second mode will be called the servo-master mode.

Figure 5:
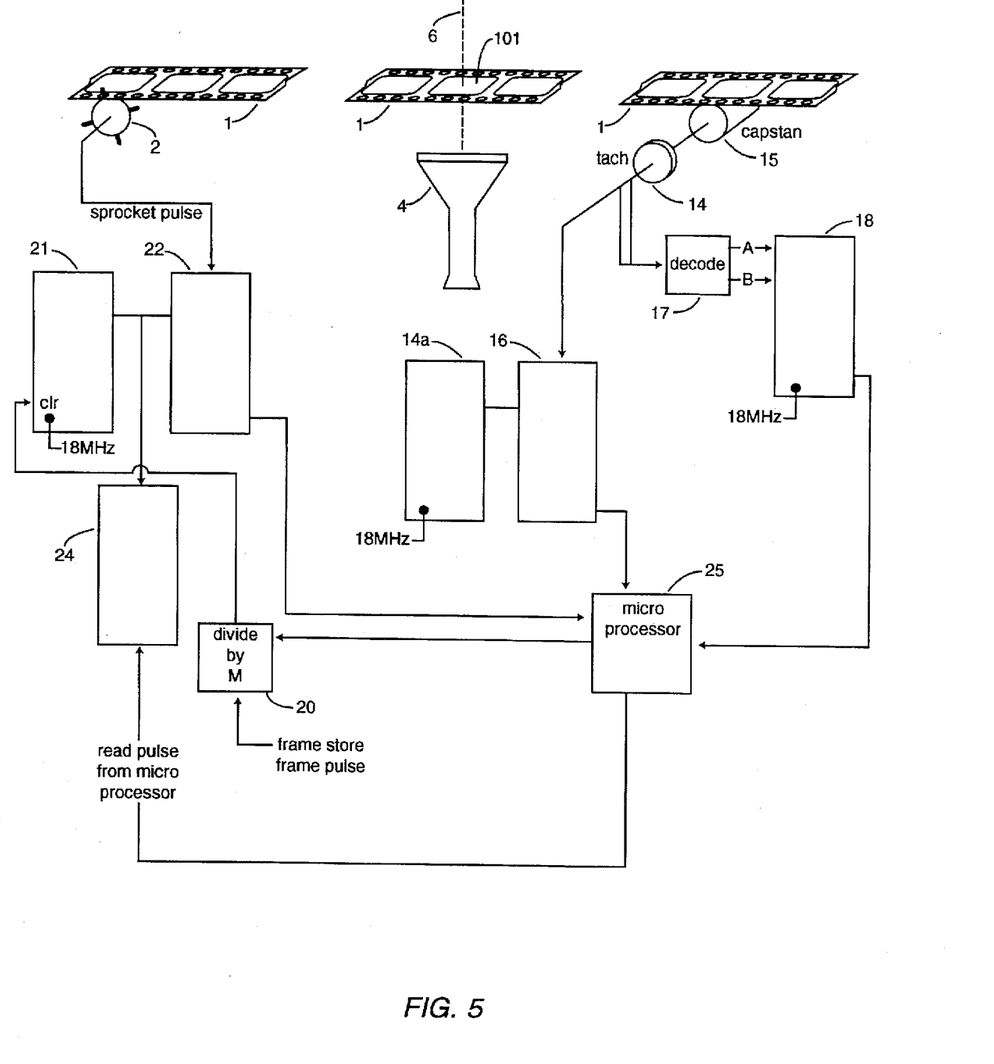
FIG. 5 is an overall schematic diagram of the servo-slave mode in which the frame store captures video frames between "freezes" of the frame store.

In FIG. 5, the telecine apparatus is set up in the servo-slave mode. A film 1 is shown in sections, the first section as it passes over the sprocket hole detector 2. Thereafter a raster scanning tube 4 is shown projecting an optical beam 6 through the film 1 in the center of the frame 101. In the third segment, the film 1 passes over a capstan driving device 13. The capstan driving device 13 has an associated tachometer 14. Preferably this tachometer is a biphase tachometer producing at least two pulse streams, roughly 90° out of phase. One pulse stream is directed to register 16 in the manner described above relative to FIG. 2. This signal could be multiplied by well known circuit techniques. Two pulse streams are feed to the quadrature decoder 17 as described in FIG. 3.

In the servo-slave mode, the frame store is permitted to continuously operate and put out framing pulses at a determined rate. Those pulses are sent to the scanning tube 4 to initiate its scanning procedure and also to the divider circuit 20. At the divider circuit 20, the frame store pulse rate is divided by an integer M sent from the microprocessor, such that, if a frame store pulse rate of P is forwarded to the divider 20, the pulse rate reaching the 24 bit counter 21 is P/M. In this mode, the microprocessor issues instructions to the frame store to "freeze" the storage of information it has received from video system 11 (see FIG. 1) on all frame store cycles except the cycle that causes the reset of counter 21 (See FIG. 7).

In the servo-slave mode, the scanning beam will continue to scan the film, but will be out of synchronization with the film frames until a predetermined time after the sprocket pulse has been received from register 22. Stated differently, the scanning beam behaves as if film frames are passing by it at a nominal speed. However, the digital circuitry permits adjustment of the film forwarding servo mechanism driving capstan 13 to feed it at a different speed and further causes the frame store in to storing of video information at the frame speed set by the servo mechanism. This requires that the film frame rate be an integer multiple/submultiple or both of the frame store frame rate.

Figure 6:
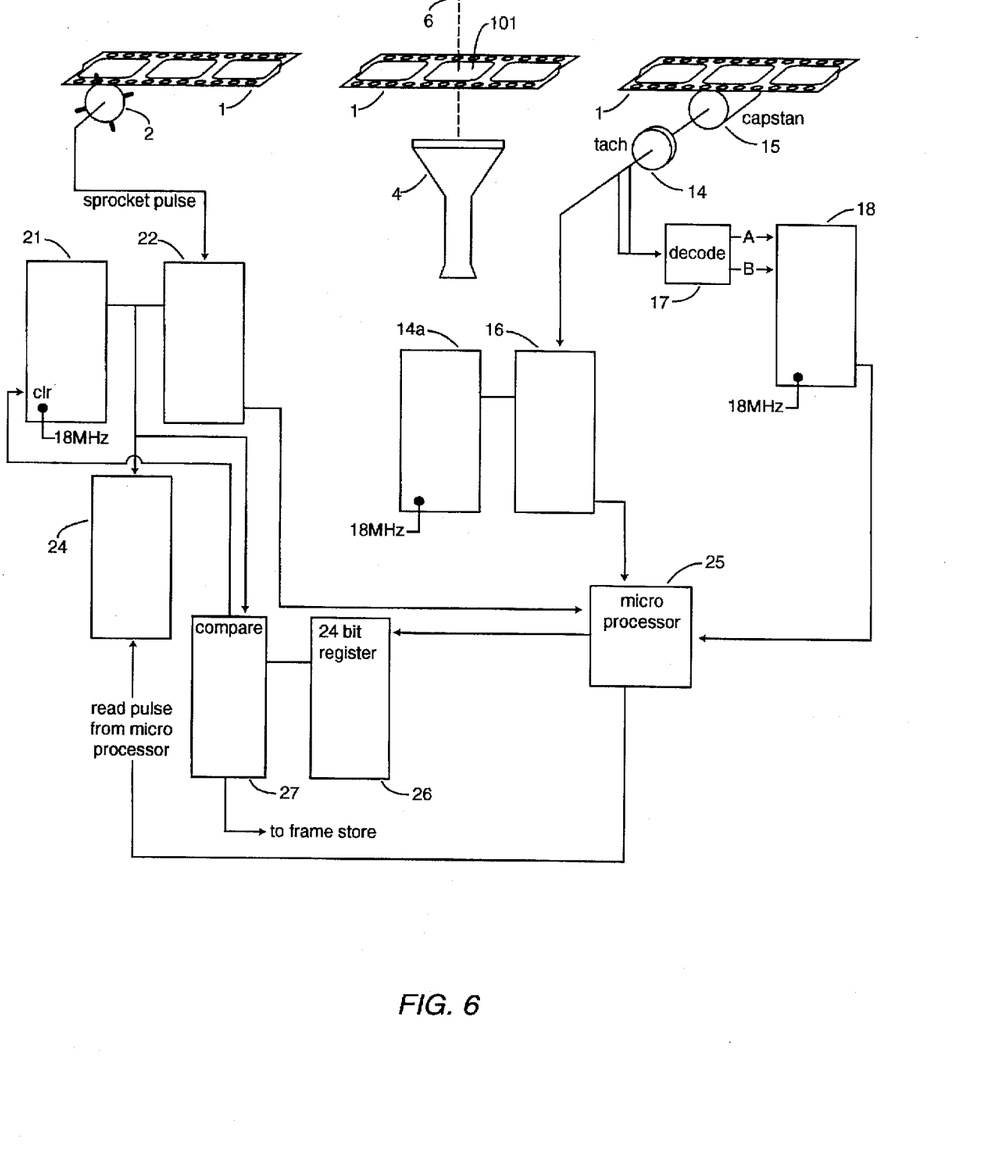
FIG. 6 is an overall diagram of the servo-master mode when the frame store is idle until triggered by a microprocessor signal.

The embodiment depicted in FIG. 6 is of the servo-master mode and essentially is the same as FIG. 5 with the following differences:

Microprocessor 20 commands the frame store (not shown) to go into a hold mode. In the hold mode, a signal from the microprocessor to the frame store triggers the frame store to record the next frame which has been arranged to align with the scanning beam 6 by action of the servo mechanism.

This trigger signal is generated by a comparator 27 which compares the count of the 24 bit counter 21. When counter 21 has reached a specific count, the comparator generates a signal to the microprocessor to reset the counter 21 to zero. A signal is also sent to the frame store to trigger a picture acquisition cycle. It also triggers the raster scanning sequence.

The advantage of the servo-master mode is that it can set up signals from the frame store at more arbitrary times. It is not required to force the spacing between frames to some integer and for submultiple of the frame store operating mode, and permits flexibility of film framing speeds.

EXAMPLE

It is required to run a particular film at a scanning rate of 875 ¼ lines per frame. This framing series is affected by running sequentially the film rate at 875 lines per frame three times and then alternating one time at 876 lines per frame. Slight vertical adjustments can be made in positioning of the scans or the capstan can be slewed to compensate for the one line differential.

It can be seen then that the modification of the telecine device herein creates a powerful tool in the hands of designers and cinema photographers. Frame speeds from −30 frames per second to +96 frames per second can be accomplished in flying spot telecines through the use of the modifications herein without introducing distortion into the electrical signals produced in converting from cinema photography to video. By altering the order the raster lines occur, the operational speeds can be increased to ±96 frames per second. Film speeds can be brought from 0 to a predetermined speed smoothly and in sequentialization with the framing requirements of the raster scanning beam. The film speed can be brought from one speed to another smoothly and back and dropped to 0 without producing flicker or other distortion into the video signals being produced.

What is claimed is:

1. An improvement in a cinema film to video transfer machine having a capstan drive and servo motor means including a capstan; a raster style video beam generating means; an optical transfer means; a video translation means; and a frame store means operable in a given speed range of frames per second, The improvement comprising:

(1) a sprocket hole detection means, including means for generating a first signal;

(2) means for determining the phase position and velocity of the capstan, including (a) a biphase tachometer producing at least two pulse stream approximately 90° out of phase to each other;

(b) a first multibit counter, said counter being driven by a clock of at least 10 MHz;

(c) a first multibit register connected via microprocessor means to said first multibit counter reading the instanteous count of said first multibit counter upon signal from said tachometer and transmitting said count back to said microprocessor means, wherein said microprocessor means compares said count reading with the next previously stored count to determine the velocity of said capstan; and (3) means for driving the capstan drive and servo motor means at a capstan linear drive rate outside the frame store given speed range while producing braodcast quality images, said means for driving the capstan and servo motor means including means of adjusting the linear film rate to an integer multiple/submultiple of the frame store speed.

2. The improvement in claim 1, including a first up/down multibit counter driven by a clock of at least 10 MHz, a multiple decoder means for receiving at least the two 90° out of phase pulse streams from said biphase tachometer and forwarding decoded pulse streams indicating count and direction to said first up/down multibit counter, said pulse streams representing the phase position of said capstan.

3. The improvement of claim 2 wherein said tachometer has pulse streams of at least 5,000 pulses per revolution of said capstan.

4. The improvement in a cinema film to video transfer machine of claim 1, comprising:

(a) a second multibit counter driven at a clock rate of at least 10 MHz;

(b) a second multibit register connected to said sprocket hole detection means, said second multibit register sampling the count of said second multibit counter, upon receipt of said first pulse signal from said sprocket hole detection means and forwarding the sampled count via said microprocessor means to the capstan motor and servo drive means to signal frame phase alignment or error thereto.

5. The improvement of claim 4, including a means for receiving a pulse signal from said frame store means, dividing the signal by a factor M and transmitting the divided signal 1/M to said second multibit counter to reset said counter, where 1/M is a submultiple of the frame store given speed.

6. The improvement of claim 5, including a third multibit register, said third register sampling the count of said second multibit counter upon signal from said microprocessor means.

7. In the improvement of claim 6, the method of determining the start/stop time of:

(a) a sampling the phase count of said second multibit counter until the desired phase count is reached or exceeded; and (b) initiating the velocity/position change in accordance with the equation:

START TIME =

$$\left\{ \text{OFFSET} - \frac{(1/2\ PL)\ (FPS)^2 (TACH)}{ACCEL} + (\text{Framing})(PL) \right\}\ Mod\ PL$$

where OFFSET is a mechanical correction factor specific to the machine; PL is the phase limit or maximum number that the phase counter counts to before it is reset; FPS is the number of film frames per second; TACH is the number of tachometer pulses; ACCEL is the rate of acceleration of the capstan; and FRAMING is a framing adjustment number varying between ±0.5.

8. The improvement of claim 5, including means for transmitting the frame store pulse signal simultaneously to said raster style video beam generating means, initiating raster scan sequence of said beam means, and to said signal divider means.

9. In a cinema film to video transfer machine of claim 1, the improvement comprising the steps of operating the capstan motor and servo drive means at a velocity gain G determined by the equation, $$G = \frac{(\text{Run Velocity})(\text{Sample Rate})}{\text{Run Velocity} + \text{Sample Rate}}$$

where "Run Velocity" is the current velocity in the capstan drive servo motor means and "Sample Rate" is the rate from said microprocessor means to said first multibit register.

10. A method of transferring information from cinema film at a first speed to broadcast quality video signals at a second and different, predetermined speed which may be greater or less than the first speed, in a telecine with an internal frame store using a beam of optical information signals, comprising the steps of:
  a) transporting said film at a substantially constant speed through a raster style light beam generator at said first speed, said beam generator and film generating a beam of optical information signals;
  b) forwarding said optical information signals to an internal frame store of the telecine having a pulse, said frame store and pulse operating at a second and predetermined speed, said telecine having a sprocket and a capstan with a biphase tachometer attached thereto, said tachometer providing a signal, and a multibit counter means providing a count with which to measure the phase of the sprocket relative to the frame store pulse, wherein the rate of the frame store pulse and the rate indicated by the signal from the tachometer have the ratio of two integers, to collect information transferred from said film; and
  c) outputting the information forwarded from said internal frame store to an external destination, wherein the difference in said first and second speeds causes selected alignment of the frames of the cinema film with the optical beam.

11. The method of claim 10 wherein the telecine has a nominal film operation rate of about 16 to about 30 frames per second, and notwithstanding said nominal rate, the film is passed at rates of less than about 16 frames per second and more than 30 frames per second through the telecine; and the only information stored in the frame store of the telecine is that generated when a film frame is properly positioned in the optical beam of the telecine.

12. The method of claim 10 wherein the telecine has a frame store and scanning beam driven by a pulse P from said frame store and having a nominal film rate from about 16 to about 30 frames per second, wherein the cinema film is passed through the telecine at a frame rate outside said nominal rate, whereby the frame store scores information only when a film frame is properly positioned in the optical beam of the telecine, and said freezing method further includes the step of storage of image information in said frame store until a next film frame is properly positioned in the optical beam.

13. The method of claim 12, wherein the telecine further includes means for providing a pulse signal upon detection of a sprocket hole in said passing cinema film, and said method further comprises the steps of operating the frame store and scanning beam of said telecine at a determined rate P in the nominal film rate of 16 to 30 frames per second, forwarding a pulse P/M from the frame store to a counter and freezing the storage of information by the telecine until a predetermined time after a pulse has been received from said sprocket hole-detection means to reset said counter where P/M is an integer multiple/submultiple of P and where M is an integer function of the film rate.

14. The method of claim 10, wherein the biphase tachometer is associated with a capstan drive motor and produces at least two pulse streams approximately 90° out of the phase; and has:
  a) a first multibit counter, said counter being driven by a clock of at least 10 MHz; and
  b) a first multibit register connected via a microprocessor driving a capstan servo motor, said first register reading the instantaneous count of said first multibit counter upon a signal from said tachometer and transmitting said count back to said microprocessor, wherein said microprocessor compares said count with a next previously stored count to determine the velocity of the capstan.

15. The method of claim 14 including a first up/down multibit counter driven by a clock of at least 10 MHz, a multiple decoder for receiving the at least two 90° out of phase pulse streams from the biphase tachometer and for forwarding decoded pulse streams indicating count and direction to said first up/down multibit counter to indicate, upon receipt of signal from said capstan drive motor, the phase position of said capstan.

16. The method of claim 15 wherein said pulse streams produced by the biphase tachometer are at least 5000 pulses per revolution of said capstan.

17. The method of claim 14, further comprising:
  a) a second multibit counter operative to measure the phase of the sprocket relative to the frame pulse of the frames stored and driven at a clock rate of at least 10 MHz; and
  b) a second multibit register, said second multibit register sampling the count of said second multibit counter upon receipt of said the pulse signal from said sprocket hole detection means forwarding the sampled count via the, microprocessor means to the capstan motor to signal frame phase alignment and/or error therein.

18. The method of claim 17, including a signal divider for receiving a pulse signal from said frame store for dividing the signal by a factor M and transmitting a signal 1/M to the second multibit counter to reset the second multibit counter.

19. The method of claim 17 including a third multibit register for sampling the count of said second multibit counter upon signal from said microprocessor.

20. The method of claim 18 where the pulse from said frame store is transmitted simultaneously to said raster style light beam generator and said signal divider.

21. The method of a claim 14, further comprising the step of operating the capstan servo motor drive at a velocity gain determined by the equation:

$$\text{Gain} = \frac{(\text{Run Velocity})(\text{Sample Rate})}{\text{Run Velocity} + \text{Sample Rate}}$$

where "Run Velocity" is the current capstan velocity in the capstan drive servo motor drive, and "sample rate" is the rate from said microprocessor to said first multibit register.

22. An improved telecine operative to convert cinema film information to broadcast quality video signals, comprising:

a) a raster style light beam generator through which cinema film may be transported at a first speed to generate a beam of optical information signals;

b) an internal frame store for receiving said optical information signals and transferring related information to an external destination, said internal frame store operating at a second speed and having a pulse;

c) a sprocket and capstan system operative to drive the cinema film at said first speed through said light beam generator, said sprocket and capstan system having a biphase tachometer attached thereto and operative to provide a signal, and multibit counter means operative to provide a count with which to measure the phase of the sprocket relative to the frame store pulse;

d) the rate of the frame store pulse and the rate indicated by the signal from the tachometer having a ratio of two integers; and e) the difference in said first and second speeds being operative to cause a selected alignment of the frames of the cinema film with the beam of optical information signals.

23. The improved telecine of claim 22 wherein:

a) the improved telecine has a nominal cinema film operation rate of about 16 to about 30 frames per second;

b) said sprocket and capstan system, notwithstanding said nominal cinema film operation rate, is operative to pass cinema film through the improved telecine at rates of less than about 16 frames per second and more than about 30 frames per second; and c) said frame store is operative to store therein only cinema film information generated when a film frame is properly positioned in the optical beam.

24. The improved telecine of claim 22 wherein:

a) the improved telecine has a scanning beam driven by a pulse P from said frame store, and has a nominal cinema film rate from about 16 frames per second to about 30 frames per second;

b) said sprocket and capstan system is operative to drive the cinema film through the improved telecine at a frame rate outside said nominal rate;

c) said frame store is operative to store information only when a film frame is properly positioned in the optical beam; and d) said frame store is further operative to freeze storage of image information therein until a film frame is properly positioned in the optical beam.

25. The improved telecine of claim 24 wherein:

a) the improved telecine further comprises means for detecting a sprocket hole in the passing cinema film and responsively generating a pulse signal;

b) the frame store and scanning beam of the improved telecine are operative at a determined rate P within the nominal film rate of about 16 to about 30 frames per second;

c) the improved telecine further comprises a counter; and d) said frame store is operative to forward a pulse P/M to said counter, freeze the storage of information by the improved telecine until a predetermined time after a pulse has been received from said sprocket hole detection means, and reset said counter when P/M is an integer multiple/submultiple of P and M is an integer function of the film rate.

26. The improved telecine of claim 25 wherein said biphase tachometer is associated with a capstan drive motor and is operative to produce at least two pulse streams approximately 90° out of phase with one another and has:

a) a first multibit counter driven by a clock of at least 10 MHz; and b) a first multibit register connected via a microprocessor driving a capstan servo motor, said first register reading the instantaneous count of said first multibit counter upon a signal from said tachometer and transmitting said count back to said microprocessor, said microprocessor being operative to compare said count with a previously stored count to determine the velocity of the capstan.

27. The improved telecine of claim 26 further comprising:

a) a first up/down multibit counter driven by a clock of at least 10 MHz; and b) a multi decoder for receiving at least two 90° out of phase pulse streams from the biphase tachometer, and for forwarding decoded pulse streams indicating count and direction to the first up/down multibit counter to indicate, upon receipt of a signal from said capstan drive motor, the phase position of the capstan.

28. The improved telecine of claim 27 wherein the pulse streams produced by the biphase tachometer and at least 5000 pulses per revolutions of the capstan.

29. The improved telecine of claim 26, further comprising:

a) a second multibit counter operative to measure the phase of the sprocket relative to the frame pulse of the frame store and driven at a clock rate of at least 10 MHz; and b) a second multibit register operative to sample the count of said second multibit counter upon receipt of said pulse signal from said sprocket hole detection means and forwarding the sampled count via the microprocessor to the capstan motor to signal frame phase alignment and/or error therein.

30. The improved telecine of claim 29 further comprising a signal divider for receiving a pulse signal from said frame store, dividing the received pulse signal by a factor M, and then transmitting the divided pulse signal to the second multibit counter to reset the second multibit counter.

31. The improved telecine of claim 29 further comprising a third multibit register for sampling the count of said second multibit counter upon signal from said micro processor.

32. The improved telecine of claim 30 wherein said frame store is operative to transmit said pulse thereof simultaneously to said raster style light beam generator and said signal divider.

33. The improved telecine of claim 26 wherein said capstan drive motor is operated at a velocity gain determined by the equation:

$$\text{Gain} = \frac{(\text{Run Velocity})(\text{Sample Rate})}{\text{Run Velocity} + \text{Sample Rate}}$$

where "Run Velocity" is the current capstan velocity in the capstan drive motor and "Sample Rate" is the rate from said microprocessor to said first multibit register.

34. A method of converting cinema film information to broadcast quality video signals, said method comprising the steps of:

a) generating a beam of optical information signals by passing the cinema film at a first speed through a light beam generator and along a rotationally driven feed device;

b) forwarding said optical information signals to a frame store device operative to generate an output pulse at a second speed different from said first speed;

c) sensing the rotational phase of the feed device;

d) correlating the sensed rotational phase of the feed device with said second speed in a manner maintaining a predetermined integer ratio therebetween; and e) creating a selected alignment between the frames of the cinema film and the optical information signal beam by maintaining a predetermined difference in said first and second speeds.

35. A cinema film-to-video transfer machine comprising:

a) a cinema film signal creation system, including a video beam generating device through which a cinema film may be passed, for creating cinema film optical information signals;

b) a rotational drive system for engaging and driving the cinema film through said video beam generating device at a first speed the drive system having a rotational speed and phase;

c) a frame store device operative to receive said optical information signals, said frame store device having an output pulse generated at a second speed different from said first speed; and d) a conversion control system operative to correlate the rotational phase of said drive system with said second speed in a manner maintaining a predetermined integer ratio therebetween, and create a selected alignment between the frames of the cinema film and the beam of the video beam generating device by maintaining a predetermined difference in said first and second speeds.

* * * * *